United States Patent [19]

Westfall

[11] 4,275,767

[45] Jun. 30, 1981

[54] FLUID RESISTOR

[75] Inventor: Norman R. Westfall, Rochester, N.Y.

[73] Assignee: Sybron Corporation, Rochester, N.Y.

[21] Appl. No.: 736,069

[22] Filed: Oct. 27, 1976

Related U.S. Application Data

[63] Continuation of Ser. No. 421,136, Dec. 3, 1973, abandoned.

[51] Int. Cl.³ .............................................. F15C 1/06
[52] U.S. Cl. ....................................... 138/40; 138/43;
 156/656; 156/664; 29/157.1 R; 29/458;
 29/DIG. 12; 29/DIG. 16; 427/89; 137/81.5
[58] Field of Search .......................... 138/43, 40, 42;
 137/833, 81.5; 29/157 R, 157.1 R, 434, 458,
 DIG. 12, DIG. 16; 156/664, 656; 427/89

[56] References Cited

U.S. PATENT DOCUMENTS

| | | | |
|---|---|---|---|
| 1,964,248 | 6/1934 | Buck et al. | 33/137 |
| 2,236,084 | 3/1941 | Brown | 138/43 |
| 2,985,566 | 5/1961 | Tisien et al. | 29/157.1 R X |
| 3,459,847 | 8/1968 | Steptoe et al. | 264/219 |
| 3,532,127 | 10/1970 | Vogelsang et al. | 138/43 |
| 3,534,757 | 10/1970 | Doherty | 137/81.5 |
| 3,680,576 | 8/1972 | Kiwak | 137/81.5 |
| 3,752,187 | 8/1973 | Retallick | 137/608 |
| 3,803,688 | 4/1974 | Peck | 29/157.3 R |
| 3,822,230 | 8/1974 | Teppy | 156/664 X |

Primary Examiner—James E. Bryant, III
Attorney, Agent, or Firm—Theodore B. Roessel; Joseph C. MacKenzie

[57] ABSTRACT

A fluid resistor with a fluid tight structure including two planar members having a surface of each contacting in close proximity. One of the planar members has a laminated structure including a substrate and at least one thin layer of substantially uniform thickness formed on the substrate. A groove extends through the layer. The groove and the surface of the other planar member define a capilliary passageway of substantially constant depth for restricted fluid flow.

11 Claims, 14 Drawing Figures

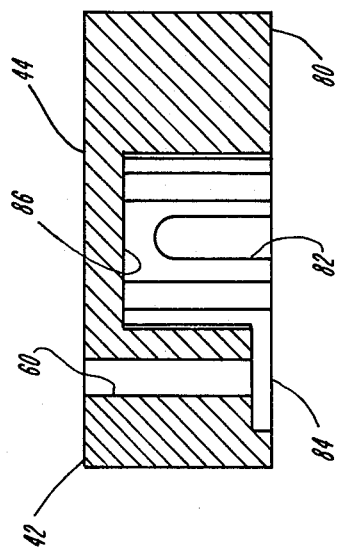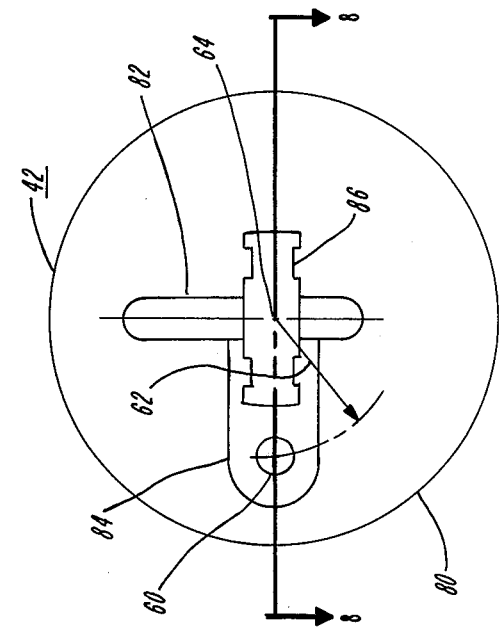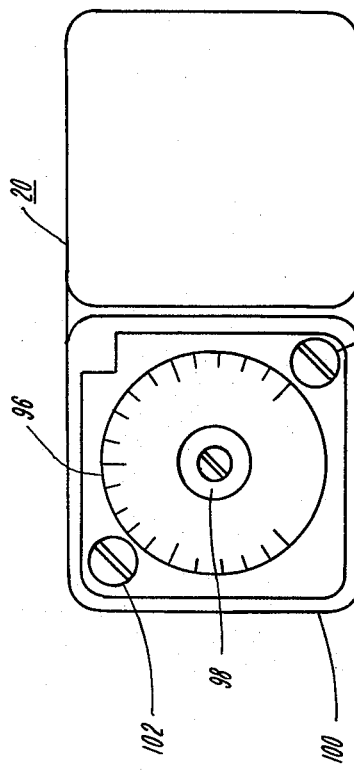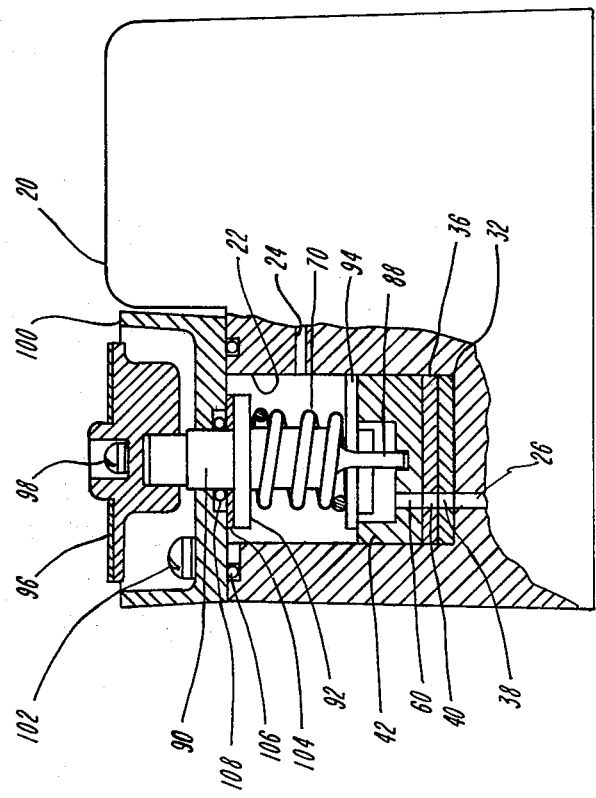

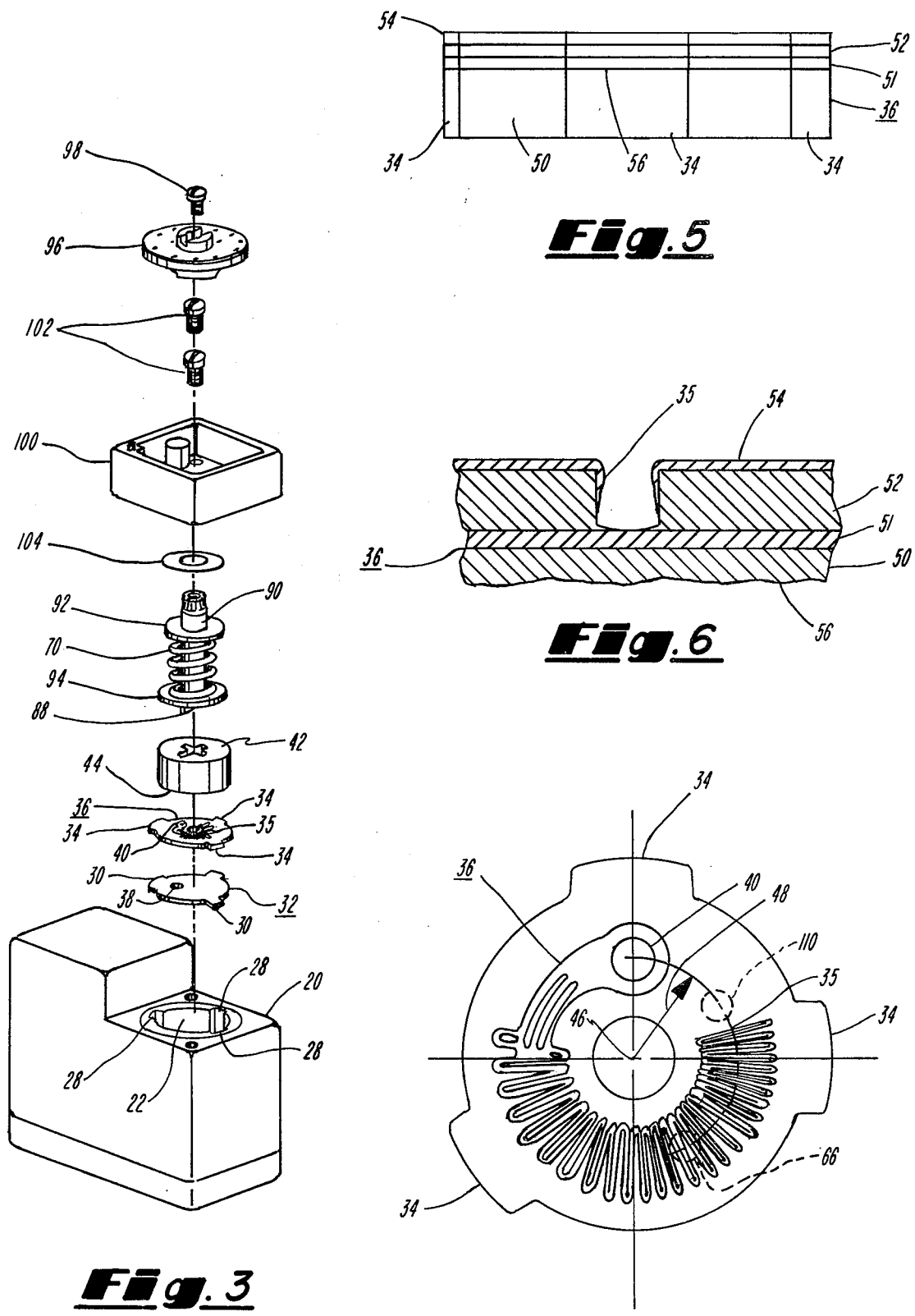

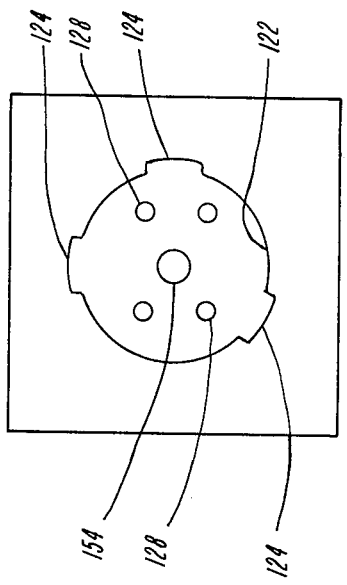
Fig.10
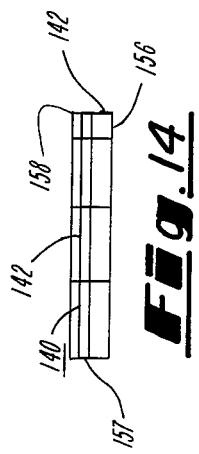
Fig.12
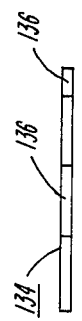
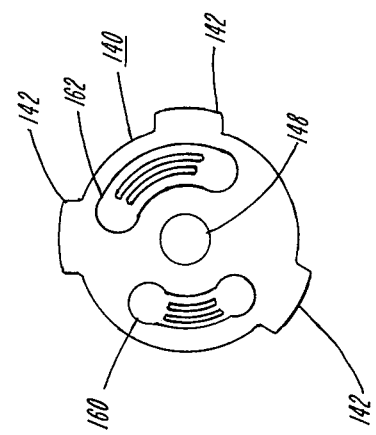
Fig.14
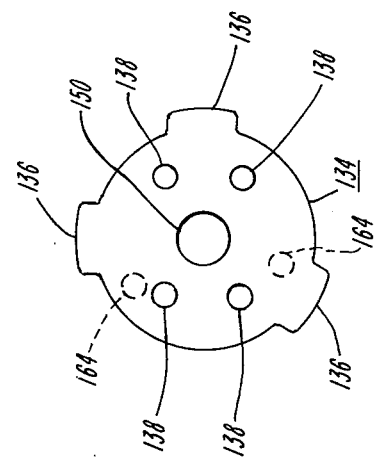
Fig.13
Fig.11
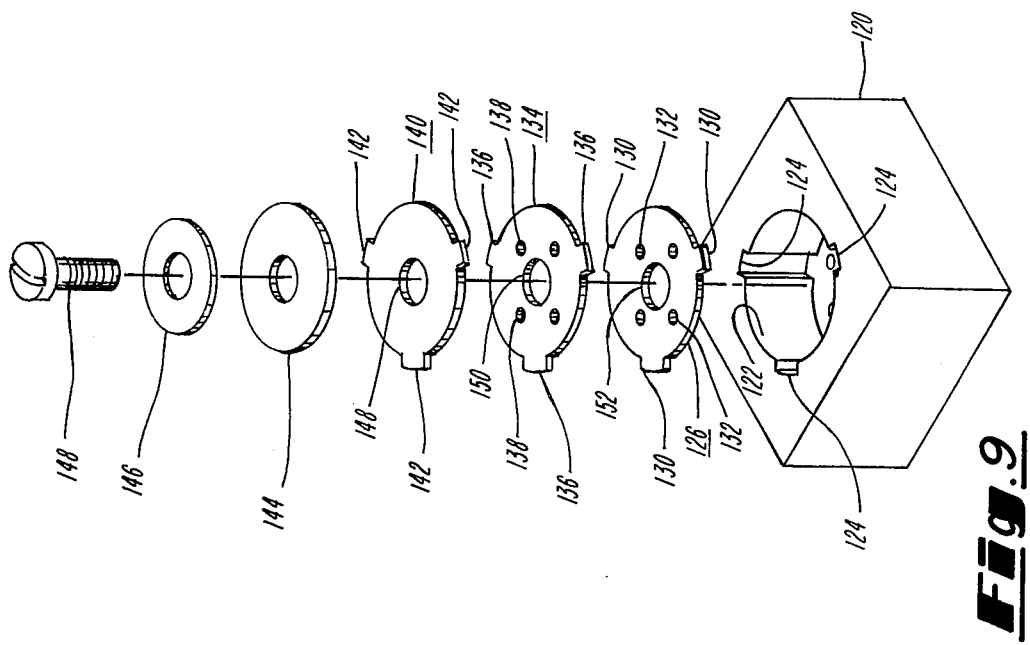
Fig.9

FLUID RESISTOR

This is a continuation of application Ser. No. 421,136 filed 3 Dec. 1973 now abandoned.

BACKGROUND OF THE INVENTION

This invention pertains to fluid resistors in general, and more particularly to a fluid resistor with a capilliary passage of substantially constant depth and of a varying configuration for providing a controllable resistance path for fluid flow.

The need for fluid resistors is important in various types of control instruments for obtaining predetermined gains and time constants such as in fluid integrators, operational amplifiers, and the like. The resistance to fluid flow in a system can be modified by the substitution of fixed value fluid resistors or the use of variable fluid resistors. A variety of fixed and variable fluid resistors or pressure dividers have been provided in the prior art, however, such devices have been found to be expensive to manufacture, difficult to manufacture with a good yield of repeatability, and in the case of variable fluid resistors having a limited range of operation. One type of variable fluid resistor of the prior art is a needle valve wherein the flow of a fluid through an aperature is controlled by the depth to which a pointed valve stem is inserted into the aperature to reduce the size of the aperature. The needle valve has the disadvantage of being particularly susceptable to dirt and other impurities since a very small area of fluid flow is controlled. In addition to the foregoing, the needle valve requires a multi-turn screw arrangement requiring many turns of a control knob to span the entire control range of the unit. This is particularly troublesome when attempting to calibrate the control knob with a scale.

Other fluid resistors have been developed in the prior art, wherein a capilliary type passageway is provided by two elements, each having a flat surface which are abutted together in close contact to provide a fluid seal therebetween. One of the elements includes groove formed into the element so that the groove and the flat surface of the element define the capilliary passageway. The size of the passageway (cross-sectional area) and the length of the passageway determine its resistance to fluid flow. The shape of the passageway varies in accordance with the particular type of structure involved and can take almost any type of form i.e., straight, curved, or serpentine. A variable fluid resistor of this type is disclosed in the U.S. Pat. No. 2,236,084, entitled "Adjustable Flow Restrictor", issued on Mar. 25, 1941 to W. J. Brown. In the device disclosed in the patent, and various other prior art devices, the capilliary groove is formed in the flat surface of one of the abutting members. Since it is the cross-sectional area of the groove that is one factor in determining the resistance of the capilliary passageway, the forming aperature, i.e. cutting milling, etc. is required to control both the width and the depth of the groove to high tolerance. Since the groove has dimensions in the thousandths of an inch, it is extremely difficult to form such grooves with a high degree of accuracy and repeatability, particularly so when the groove is of the complex or serpentine configuration. Furthermore, the difficulty experienced in accurately forming these grooves limits the length to which such capilliary grooves can be manufactured on a repeatable basis and therefore limited the range of variable fluid resistors. Because of the difficulties involved in manufacture the cost, etc., and the wide range of resistance values needed to fulfill control requirements, a plurality of variable fluid resistors are now provided, each having a different range that are to be substituted in the event that the system time constants or requirements exceed the resistance range of the particular device used.

A U.S. Pat. No. 3,532,127, entitled "Variable Fluidic Resistor Device", issued on Oct. 6, 1970 to T. H. Vogelsang et al, discloses a fluid resistor in which the the capilliary passage was provided by a laminate having a slot cut therethrough positioned between the flat surfaces of a pair of planar members, wherein the thickness of the laminate determines the depth of the capilliary passageway. With such an arrangement, the depth of the capilliary groove is fixed and the width of the groove is cut in accordance with the fluidic resistance requirements. With the laminate, the width of the slots cut therethrough (in the tens or hundredths of a thousandths of an inch) were generally greater than the slot depth (laminate thickness). As a result, the slots were required to be cut through very thin material. This presents problems not only in the required precision machining but also in the handling assembly and cleaning of such devices. Any dend, bend, etc., in the thin laminate material because of faulty handling, or machining, or the like, could destroy the laminate.

When the fluid resistors are to be variable, either the element having the capilliary groove, or its abutting element, is moved, or rotated, to control or select that portion of the capilliary passageway to be used for fluid flow. In such case, it is highly desirable that a lubricating tight sealing arrangement be provided so that wear and tear is minimized. This wear and tear between the abutting surfaces is particularly troublesome since large forces are required to be exerted on the planar members to assure that a good seal is achieved and leakage is minimized. It is therefore very important that the capilliary grooves are formed with smooth edges so that the abrasive effect of the movements between abutting surfaces of the planar members is minimized. This is particularly true when one of the flat planar members is made of valve sealing material to provide the desired degree of sealing and lubrication. Any rough edge of a groove tends to cut into the sealing planar surface and particles of valve material may fall into the groove and block or clog the capilliary passageway, thereby rendering the device useless. It would be highly desirable if a fluid resistor could be provided that includes a capilliary passageway that can have any variety of configurations without the need for precision forming of the depth of the capilliary passageway, and without creating rough edges. It would also be highly desirable if such fluid resistors could be manufactured on a mass production basis with a high degree repeatability in the operating characteristics.

It is therefore an object of this invention to provide a new and improved fluid resistor and the like.

It is also an object of this invention to provide a new and improved variable fluid resistor.

It is another object of this invention to provide a new and improved fluid resistor that can be manufactured by low cost mass production techniques with a high degree of repeatability.

It is also an object of this invention to provide a new and improved fluid resistor in which precision machining or cutting is not required to generate the capilliary groove, and the capilliary groove can be formed with smooth or rounded edges.

It is also an object of this invention to provide a new and improved fluid resistor wherein the capilliary groove has a substantially constant depth and wherein only the width and length of the groove need be controlled in the manufacture thereof.

BRIEF DESCRIPTION OF THE INVENTION

A fluid resistor wherein a laminated disc is provided that includes a base substrate having a substantially flat surface and at least one thin layer deposited on the flat surface having a substantially uniform thickness throughout. A groove is formed in the disc that extends through the layer. A plate member, having a substantially flat surface, is positioned over the groove so that a sealed connection is made and that the groove and the flat surface of the plate member define a capilliary passageway for restricted fluid flow.

A fluid resistor including the invention, can comprise a fixed or a variable resistance. In the case of a variable resistance, the disc is formed with an aperature extending from the groove through the disc. The plate member also is formed with an aperature extending therethrough and is positioned to engage the groove. Means are provided for displacing the relative positions of the aperatures in the groove and the plate, wherein the resistance of the variable resistor is a function of the distance between the aperatures.

In accordance with another feature of the invention another thin layer of substantially constant thickness is deposited over the other layer and over at least portions of the groove wherein the additional layer provides a hardened bearing surface for the other layer and also functions to round off the edges in the groove.

In the case of a fixed fluid resistor, the plate member can for example, include a pair of aperatures that contact different portions of the groove formed in the laminated disc and provide a fixed resistance for fluid flow through the aperatures and that portion of the groove located between the aperatures.

The use of a laminated structure for the disc provides an arrangement wherein a groove can be formed therein by standard photoetching techniques of the type presently used in the manufacture of printed circuit boards. If the substrate is made of material resistant to photoetching techniques, such as fiberglass, the thin layer having the groove formed therein can be deposited directly on the substrate. If the substrate is made of material susceptible to the photoetching, such as aluminum, then the flat surface of the substrate is initially coated with a thin layer of photoetching resistive material prior to the deposition of the thin layer into which the groove is formed. Since the thickness of the thin layer having the groove is uniform, only the width of the groove need be controlled. With such an arrangement, a large variety of complex forms of grooves can be formed in the laminated disc at relatively low cost and with a high degree of repeatability so that such fluid resistors can be built on a mass production basis.

BRIEF DESCRIPTION OF THE FIGURES

FIG. 1 is a top view of a variable fluid resistor including the invention.

FIG. 2 is a side view of the variable fluid resistor of FIG. 1 including a portion cut away for viewing the internal assembly thereof.

FIG. 3 is an exploded view of the variable fluid resistor of FIG. 1.

FIG. 4 is a plane view of a laminated disc for the variable fluid resistor of FIG. 1 including a capilliary groove formed therein.

FIG. 5 is a side view of the laminated disc of FIG. 4.

FIG. 6 is an enlarged sectional view of a portion of the disc of FIG. 4 disclosing a cross-section view of the capilliary groove formed therein.

FIG. 7 is a top view of rotatable control plate of the variable fluid resistor of FIG. 1.

FIG. 8 is a sectional view of the control plate of FIG. 7 taken along lines 8—8.

FIG. 9 is an exploded view of a fixed fluid resistor including the invention.

FIG. 10 is a top view of the housing for the fixed fluid resistor of FIG. 9.

FIG. 11 is a plane view of a control plate for the fixed fluid resistor of FIG. 9.

FIG. 12 is a side view of the control plate of FIG. 11.

FIG. 13 is a plane view of a laminated disc including a capilliary groove formed therein for use in the fixed fluid resistor of FIG. 9.

FIG. 14 is a side view of the laminated disc of FIG. 13.

DETAILED DESCRIPTION OF THE INVENTION

An embodiment of a variable fluid resistor including the invention is illustrated in FIGS. 1–8. The variable fluid resistor is mounted within a die cast housing 20 that functions a recepticle and a capacity tank. The housing 20 is formed with a cylindrical cavity 22 having an input port 24 extending through the cylindrical side of the cavity 22 for applying pressurized fluid flow thereto and an output port 26 extending from the bottom of the cavity 22. As illustrated in FIG. 3, the cylindrical cavity 22 is also formed with a plurality of guides 28 extending inward from the cylindrical surface into the housing and parallel to the axis of the cylinder. The guides 28 extend from the top of the cavity to the bottom of the cavity. The guides 28 provide a means for receiving the tabs 30 of a neopreme cushion and seal 32, and the tabs 34 of a laminated disc 36 having a capilliary groove formed therein in accordance with the invention. The guides 28 and the tabs 30 and 34 function to assure that the seal 32 and the laminated disc 36 are positioned within the housing 20 in a predetermined orientation and are maintained stationary. The seal 32 and the laminated disc 36 are formed with the aperatures 38 and 40, respectively, extending therethrough. The orientation of the tabs 30 and 34 and the guides 28 are such that when the seal 32 and the laminated disc 34 are placed within the cylindrical housing 22, the aperatures 40 and 38 are in alignment with the output port 26 to allow the flow of fluids therethrough.

The laminated disc 36 is positioned within the cylindrical cavity 22 so that the capilliary groove 35 extends away from the neopreme seal 32. A rotatable control plate 42 having the form of a solid cylinder is positioned on the laminated disc 36. The bottom 44 of the control plate 42 is substantially flat wherein the bottom 44 of the control plate 42 and the capilliary groove 35 in the laminated disc 36 define a capilliary passage for fluid flow. The embodiment of the capilliary groove 35 illustrated in FIG. 4 includes a variable serpentine form that follows a radial path about the center 46 of the disc 36 at a radius 48. One end of the capilliary groove 35 is closed off while the other end of the groove terminates in the aperature 40. The neopreme seal 32 has the same size and shape as laminated disc 36 and has its aperature 38 located in the identical position as the aperature 40 of the laminated disc 36.

As illustrated in FIG. 5, the laminated disc 36 includes a rigid substrate 50 with a first layer 51 deposited on the flat surface 56 of the substrate 50, a second layer 52 deposited on the first layer 51 and a third layer 54 deposited on the second layer 52. The substrate 50 can be made of a rigid metal, such as aluminum and in the embodiments of the fluid resistor illustrated has thickness in the order of 0.05 inches. The first layer 51 deposited upon the flat surface 56 of the substrate 50, is a thin layer of material resistive to photoetching techniques such as a polyethylene, epoxy or polyester adhesive having a thickness in the order of 0.0005 inches. The second layer 52, deposited on the first layer 51, can be a layer of copper clading such as that provided on electronic circuit boards and having a thickness in the order of 0.005 inches. Copper clading of this type is commonly available with a thickness tolarence in the order of +0.0001 to 0.0002 inches. With this type of laminated disc, the capilliary groove 35 can be formed in the copper clading layer 52 by conventional photoetching techniques to provide essentially any variety of forms and shapes. If the substrate 50 is made of material that is resistive to photoetching techniques, such as for example, fiberglass, then the first layer 51 can be eliminated and the substrate surface limits the depth of the groove to the thickness of the copper layer 52.

Present day photoetching techniques permit the control of the width of the groove 35 to within +0.0003 inches and also provide for the consistant etching of groove as narrow as 0.002 inches. Hence, it can be seen, by using a laminated type material for the disc 36, the depth of the groove 35 is automatically controlled by the thickness of the copper clading layer 52. The cross-sectional area of the groove 35 is determined by controlling the width of the groove. As mentioned above, the width of such a groove can be controlled within +0.0003 inches inches wherein an extremely accurate capilliary groove can be formed within the disc 36. Furthermore, by the use of standard type photoetching type techniques which have been perfected to a high degree, any variety of complex forms of capilliary grooves can be formed on the disc 36, such as that illustrated in FIG. 4. By closely controlling the etching time, the capilliary groove 35 can be formed with a substantially rectangular cross-section (as illustrated in FIG. 6) so that the capilliary pattern can be accurately repeated from unit to unit thereby assuring uniformity in the manufacture of the variable fluid resistors including the invention. As a result, any type of variable function can now be readily provided such as for example linear, logarithmic, etc. In addition to the foregoing, with the use of such complex serpentine capilliary grooves, the variable range of such pressure dividers can be greatly increased over that available in the prior art devices.

As illustrated in FIGS. 7 and 8, the rotatable control plate 42 is formed with an aperature 60 extending therethrough. The aperature 60 is located at a radius 62 from the center 64 of the plate 42 wherein the radius 62 is equal to the radius 48 of the laminated disc 36. The cylindrical shape of the plate 42 allows the plate to be rotated relative to the laminated disc 36 wherein the aperature 60 extends over varying portions of the capilliary groove 35, such as for example as illustrated by the dashed circle 66 in FIG. 4. In order to assure that a proper seal is provided between the laminated disc 36 and the rotatable control plate 42, a spring 70 applys a strong resilient force (as explained in greater detail in a later portion of the specification) urging the rotatable plate 42 and the laminated disc 35 in close proximity with each other to minimize any leakage therebetween. Hence, as can be seen, the capilliary passageway for fluid flow through the variable fluid resistor includes the input port 24, the aperature 60, the capilliary groove 35, the aperature 40, the seal aperature 38, and the output port 26.

In order to achieve an adequate seal, a force of about 90 lbs. is needed to force the surfaces of the laminated disc 36 and the rotatable control plate 42 together. With this type of force, it is desirable that the control plate 42 be made of a lubricating and sealing material. It has been found that a carbon filled teflon material provides the ideal valve seal material because of its lubricity, its excellent wear resistance, and its good sealing properties. The control plate 42 can be readily manufactured by compression molding. Aluminum is preferred for the substrate 50 in that eliminates problems that may result from dust from a fiberglass substrate, and aluminum can be more readily machined, such as for example, wherein the aperature 40 can be manufactured by a punch type process.

As a result of the high forces exerted between the rotatable control plate 42 and the laminated disc 36, and the rotational motion involved (when setting the variable fluid resistor), it was found desirable to deposit a third layer 54 over the copper layer 52 after the formation of the capilliary groove 35. For example, the layer 54 can comprise of uniform coating of nickel having a thickness on the order of 0.0002 inches electroplated onto the laminated disc 36. The nickel plate layer 54 was found to increase the lubricity and the resistance to wear between the surfaces of the laminated disc 36 and the control plate 42. In addition to the foregoing, it was found that the nickel plate layer 54 produced an added advantage wherein the plated layer tends to round off the edges of the groove 35 in the copper layer 52, thereby further reducing the abrasive effect between the laminated disc 36 and the control plate 34 and thereby minimizing the possibility of copper or teflon flakes contaminating the capilliary passageway.

The side 80 of the control plate 42 (the side opposite that making contact with the disc 36) is formed with two grooves 82 and 84 that extend to the aperature 60 to assure the proper flow of fluid from the input port 24 to the aperature 60. An additional slot 86 is formed in the plate 42 (at a greater depth) for receiving the flat tab 88 of a control shaft 90, to control the rotation of the plate 42. The control shaft 90 extends through a retaining washer 94 and a teflon thrust washer and seal 92 with the spring 70 disposed between the washers 92 and 94. A control dial 96 is secured to the top of the shaft 90 via a screw 98 to control the rotational position of the control plate 42. The variable fluid resistor is assembled by the use of a cap 100 and a pair of screws 102. A teflon washer 104 is disposed between the cap 100 and the thrust washer 92. A pair of O-rings 106 and 108 (FIG. 2) are used to assure a proper seal between the cap 100 and the housing 20 and between the control shaft 90 and the cap 100. The arrangement is such that when the variable fluid resistor is assembled, the spring 70 applies a resilient force between the control plate 42 and the laminated disc 36 to seal the capillary passageway.

In operation, all the fluid through the variable fluid resistor must pass through the aperature 60 in the control plate 42 and hence onto the etched surface of the laminated disc 36. The disc 36 has an aperature 40 at the same radial distance from the axis of rotation as that of aperature 60. When the control plate 42 is rotated so that the aperatures 40 and 60 are coincident (FIG. 2) the variable fluid resistor has its minimum resistance to fluid flow. If the control plate 42 is rotated so that the aperature 60 is located in the position illustrated by the dashed circle 110 (FIG. 4), there is no capillary passageway between the aperatures 60 and 40 and therefore the variable fluid resistor is completely closed. If the control plate 42 is rotated so that the aperature 60 is positioned to coincide with the dashed circle 66 the aperatures 60 and 40 are interconnected by the capilliary passageway, the length of which, and the cross-section of which, determine the path resistance to fluid flow.

Although the variable fluid resistor of FIGS. 1-8 is disclosed and described with the laminated disc 36 held stationary and the control plate 42 is rotated to select the value of resistance, it is to be understood that the arrangement can be reversed wherein the control plate 42 can be held stationary and the laminated disc 36 rotated. In addition to the foregoing, although the variable fluid resistor is described and illustrated as providing a rotational displacement between the control plate 42 and the laminated disc 36, it should be understood that since an infinite variety of grooves 35 can be formed in the laminated disc 36 the displacement between the plate 42 and disc 36 can be other than rotational, such as for example linear.

With the particular pattern of capilliary groove 25 disclosed in FIG. 4, it was found that the variable fluid resistor of the invention provides a variable resistance range with the order 10,000:1. The prior art variable fluid resistors that are commercially available have a range in the order of 4,000:1. As a result, in the prior art two types of variable fluid resistors were normally required, one having a range of 50:1, while the other having a range of 1000:1, in an arrangement wherein the resistance values covered by these variable ranges would overlap. If the particular variable fluid resistor did not have the required range, the other fluid resistor having the desired range would be substituted for the original unit. The substituting arrangement has the added cost in requiring the stocking of two such variable fluid resistors plus the cost and time involved in interchanging, or substituting such devices. This particularly troublesome when instruments are ordered for newly designed control systems wherein the expected time constants are calculated, or estimated, and the variable fluid resistors were purchased to conform with the estimated or calculated values. Any error in the calculation or estimation wherein the system time constants involved would exceed that for which the instrument was capable of handling, would require the substitution of a new instrument, or the substitution of a new variable fluid resistor. This is particularly troublesome if the instrument was not readily available causing further delay in the ordering a new instrument. Since the variable fluid resistor of the invention has a range 10,000:1 and covers the combined resistance ranges of the variable fluid resistors of the prior art, only one type of fluid resistor or instrument need be ordered and thereafter adjusted to provide the desired resistance value.

FIGS. 9-14 describe a fixed fluid resistor including the invention. The fixed fluid resistor includes a housing 120 formed with a cylindrical cavity 122 which also includes a plurality of guides 124 formed in the sides of the cavity and parallel to the cylindrical axis of the cavity. A plurality of aperatures 128 are formed in the bottom of the cavity to function as the input and output ports. The first unit inserted into the cavity 122 is a neoprene seal 126 which has a plurality of tabs 128 extending radially therefrom to fit within the guideways 124, and also includes a plurality of aperatures 132 that conform to the positions of the aperatures 128. Positioned on top of the seal 126 is a rigid fixed plate 134 which has the general shape as the seal 128 and also includes a plurality of tabs 136 and a plurality of aperatures 138. The plane view of the plate 134 and the seal 126 is illustrated in FIG. 11, while the side view thereof is illustrated in FIG. 12.

A laminated disc 140, of the type illustrated in FIGS. 13 and 14, having the tabs 142 extending therefrom is positioned on the plate 134 so that the grooves 160 and 162 formed in the laminated disc 140 face the plate 134. Two washers 144 and 146 are then successively placed on the laminated disc 140 and a screw 148 extends through the washers 146 and 144 and through the openings 148, 150, 152 in the laminated disc 140, the plate 134, and the seal 126, to a threaded aperature 154 in the housing 120.

The disc 140, as in the case of the disc 36 of FIGS. 1-8, includes a rigid substrate 156 such as for example aluminum and a thin deposited layer 157 of photoetching resistive material of uniform thickness, and a thin layer of metal 158 of uniform thickness such as for example copper. The pair of capilliary grooves 160 and 162 are formed on the laminated disc 154 that extend through the layer 158 to the surface of the layer 157 in a manner as previously described above with regard to the laminated disc 36. The ends of the capilliary passageways are expanded into cavities having substantially the same size as the holes 138 in the plate 134. Since there is no rotary motion involved, there is no need for a third layer such as the nickel layer 54 of the laminated disc 36. Alternatively the substrate 156 can be formed of material that is resistive to photoetching techniques, such as fiberglass, in which case the layer 157 can be eliminated. With the arrangement illustrated, two resistances are provided by the same unit the resistance of which is determined by the capilliary grooves 160 and 162. As an alternative, the fixed fluid resistor can be modified by eliminating a pair of holes 138 in the place 134 and substituting therefore the dashed holes 164. With such an arrangement, we have a fluid resistor that can have either of two fixed resistance values depending upon the manner in which the plate 134 is inserted. For example, the plate 134 can be inserted with one surface up wherein one of the holes 138 and 164 match up with one of the capilliary grooves 160 and 162 providing one value of resistance. If the plate 134 is reversed, wherein the other one of the pairs of holes 164 and 138 match up with the other capilliary grooves and provide the other value of resistance. As in the case of the variable resistance, the capilliary grooves 160 and 162 can be formed by standard photoetching techniques wherein a wide range of fixed resistances can be available and wherein the resistances can be changed by merely the substitution of the laminated disc 140.

It has been found that the fluid resistances including the invention can be produced on a low cost mass production basis that requires little special handling. The laminated discs are relatively rigid units and do not require any special handling other than that generally applied to the assembly of delicate control instruments. By the use of the laminated disc and photoetching techniques, a uniformity of resistance values from disc to disc can be achieved wherein the fluid resistors can be assembled with a minimum of calibration. In addition to the foregoing, since the laminated disc can be produced with a close repeatability, there is a complete interchangeability of components.

Since photoetching techniques can be used to create the capilliary groove, the groove can be tailored to take any type of form depending upon the characteristics desired. For example, the variable fluid resistor can customize the relation of resistance to rotational actuation of the control shaft to a high degree of accuracy, i.e., linear or almost any other special function desired. Furthermore, a single turn of the control dial provides a variable resistance range from fully open to fully closed. The resistance indication can be taken directly from the rotating control shaft without the need of gear reductions, etc. A capilliary groove can be easily formed wherein the resistance characteristic versus the angular travel of the control shaft can be a logarimethic function so as to conform to the uniform resolution of commonly used for reset rates, i.e., to allow the numbers on the dial to be evenly spaced. With essentially unlimited reproducibility of the valve assemblies with nearly identical capilliary grooves, a single universal dial can be used with a single point calibration. In addition to the foregoing, in the case of the variable fluid resistors the use of the laminated disc and the photoetching techniques for developing the capilliary grooves provide an arrangement wherein a substantially large variable range of resistance values is available from a single unit, wherein the single variable fluid resistor including the invention provides the entire range of fluid resistances expected to be used in control units and thereby minimizing the number of control units or assemblies to be stocked. It should be noted that since the elements forming the fluid resistor (including the invention), include non-fragile parts, the assembly can be easily dismantled for cleaning, or replacement of parts, without excessive care or special handling other than that normally used in the cleaning and assembling of control instruments.

I claim:

1. In the method of making a fluid resistor of the type wherein a capillary groove provides fluid resistance, and wherein said fluid resistor comprises first means having a first flat surface, second means having a second flat surface, and layer means having third and fourth equi-spaced opposing flat surfaces, and wherein said first means is relatively rigid and has said third flat surface fixed to its said first flat surface, said second means has its said second flat surface sealingly fitted to said fourth flat surface, and said first, second, third, and fourth flat surfaces being substantially parallel to one another and coextensive; the improvement comprising: providing said layer means in the form of a layer of material of uniform thickness by fixing such material everywhere to said first flat surface, and thereafter removing a portion of said layer of material from said first flat surface, whereby to provide said capillary groove; such removal creating an edge of said material remaining fixed to said first flat surface, said edge defining the shape of said capillary groove, and the thickness of said layer of material defining the thickness of said capillary groove.

2. A fluid resistor made in accordance with claim 1.

3. The invention of claim 1, wherein there is a fluid connection in said second means, with said fluid connection having an opening in said second flat surface and over said capillary groove, and said second means being slidably sealingly movable with respect to said fourth flat surface, with said opening moving over said capillary groove.

4. A variable fluid resistor made in accordance with claim 3.

5. The invention of claim 1, including the further improvement of fixing a uniform coating of material substantially everywhere to said fourth flat surface and over said edge, after said portion of said layer of material has been removed from said first flat surface.

6. A variable resistor made in accordance with claim 5.

7. The invention of claim 5 wherein said layer of material is metal and said uniform coating is another metal.

8. The invention of claim 7 wherein said metals are respectively copper and nickel.

9. A fluid resistor made in accordance with claim 7.

10. The invention of claim 9 wherein there is a fluid connection in said second means, with said fluid connection having an opening in said second flat surface and over said capillary groove, and said second means being slidably sealingly movable with respect to said fourth flat surface, with said opening moving over said capillary groove.

11. A fluid resistor made in accordance with claim 10.

* * * * *